United States Patent
Miyata

(10) Patent No.: US 11,068,337 B2
(45) Date of Patent: Jul. 20, 2021

(54) DATA PROCESSING APPARATUS THAT DISCONNECTS CONTROL CIRCUIT FROM ERROR DETECTION CIRCUIT AND DIAGNOSIS METHOD

(71) Applicant: FUJITSU LIMITED, Kawasaki (JP)

(72) Inventor: Shinya Miyata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 16/523,031

(22) Filed: Jul. 26, 2019

(65) Prior Publication Data
US 2020/0042379 A1    Feb. 6, 2020

(30) Foreign Application Priority Data
Aug. 1, 2018    (JP) .............................. JP2018-145079

(51) Int. Cl.
| G06F 11/10 | (2006.01) |
| G06F 11/00 | (2006.01) |
| G06F 11/07 | (2006.01) |
| G06F 13/28 | (2006.01) |

(52) U.S. Cl.
CPC ........ *G06F 11/1004* (2013.01); *G06F 11/073* (2013.01); *G06F 11/079* (2013.01); *G06F 13/28* (2013.01)

(58) Field of Classification Search
None
See application file for complete search history.

(56) References Cited

U.S. PATENT DOCUMENTS

| 5,621,883 | A  | * | 4/1997 | Thoulon | ................. | G06F 13/28 |
| | | | | | | 714/42 |
| 5,668,815 | A | * | 9/1997 | Gittinger | ................ | G11C 29/36 |
| | | | | | | 714/719 |
| 6,694,360 | B1 | * | 2/2004 | Duguay | .................. | H04L 69/22 |
| | | | | | | 709/220 |
| 7,904,771 | B2 | * | 3/2011 | Mochizuki | ........... | G01R 31/317 |
| | | | | | | 714/724 |
| 2014/0108869 | A1 | * | 4/2014 | Brewerton | .......... | G06F 11/1048 |
| | | | | | | 714/42 |
| 2016/0179612 | A1 | * | 6/2016 | Jokinen | ............... | G06F 13/4022 |
| | | | | | | 714/807 |

FOREIGN PATENT DOCUMENTS

| JP | 07-302207 | 11/1995 |
| JP | 10-161954 | 6/1998 |

* cited by examiner

*Primary Examiner* — Justin R Knapp
(74) *Attorney, Agent, or Firm* — Fujitsu Patent Center

(57) ABSTRACT

A data processing apparatus includes a processor; and a direct memory access (DMA) controller coupled to the processor, the DMA controller including a control circuit that controls a DMA transfer of data, an error detection circuit that performs an error detection on the data based on a character assigned in association with the data to output a result of the error detection to the control circuit, and a diagnosis circuit that disconnects between the control circuit and the error detection circuit to diagnose an operation of the error detection circuit and provide a diagnosis result to the processor.

15 Claims, 13 Drawing Sheets

DATA PROCESSING APPARATUS THAT DISCONNECTS CONTROL CIRCUIT FROM ERROR DETECTION CIRCUIT AND DIAGNOSIS METHOD

CROSS-REFERENCE TO RELATED APPLICATION

This application is based upon and claims the benefit of priority of the prior Japanese Patent Application No. 2018-145079, filed on Aug. 1, 2018, the entire contents of which are incorporated herein by reference.

FIELD

The embodiments discussed herein are related to a data processing apparatus and a diagnosis method.

BACKGROUND

A data processing apparatus such as a computer includes various devices such as a central processing unit (CPU), a random access memory (RAM), and peripheral devices such as an input/output device. The data processing apparatus employs a direct memory access (DMA) to perform a data transfer between the RAM and the peripheral device at high speed. The DMA is a technology for transferring data between the (RAM) and a peripheral device (or from one storage area to another storage area on the RAM) without intervention of the CPU.

For example, there has been offered a data communication apparatus which activates a DMA circuit to DMA-transfer block data from a shared memory to a buffer memory when transmitting a frame. The offered data communication apparatus makes it possible to detect a transmission error on a block basis by assigning, to each block in a transmission frame, an error check character for detecting the transmission error.

In a bus collation processing device that detects a mismatch of data on the buses of two dual system processing devices operating in synchronization, there has been offered a technique in which data transfer in communication control is performed at high speed by a DMA controller (DMAC). The offered bus collation processing device uses the DMAC to transmit test pattern data for diagnosis to the bus collation logic circuit.

Examples of the related art include Japanese Laid-open Patent Publication No. 10-161954 and Japanese Laid-open Patent Publication No. 7-302207.

SUMMARY

According to an aspect of the embodiments, a data processing apparatus includes a processor; and a direct memory access (DMA) controller coupled to the processor, the DMA controller including a control circuit that controls a DMA transfer of data, an error detection circuit that performs an error detection on the data based on a character assigned in association with the data to output a result of the error detection to the control circuit, and a diagnosis circuit that disconnects between the control circuit and the error detection circuit to diagnose an operation of the error detection circuit and provide a diagnosis result to the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a DMA transfer, a character for error detection (for example, a block check character (BCC)) is assigned in association with data in order to detect a transmission error of the data. Therefore, in order to improve the reliability of data transfer, it is conceivable that a higher-level controller such as a CPU inputs a set of normal data and the relevant character and a set of abnormal data and the relevant character to the DMA controller to diagnose whether a data error is properly detected. However, when the diagnosis is performed by the host controller, the load for activating the DMA controller and instructing data transfer is placed on the host controller, whereby the performance of the data processing apparatus in the normal operation may be degraded.

Hereinafter, the present embodiment will be described with reference to the drawings.

First Embodiment

The first embodiment will be described.

Figure 1:
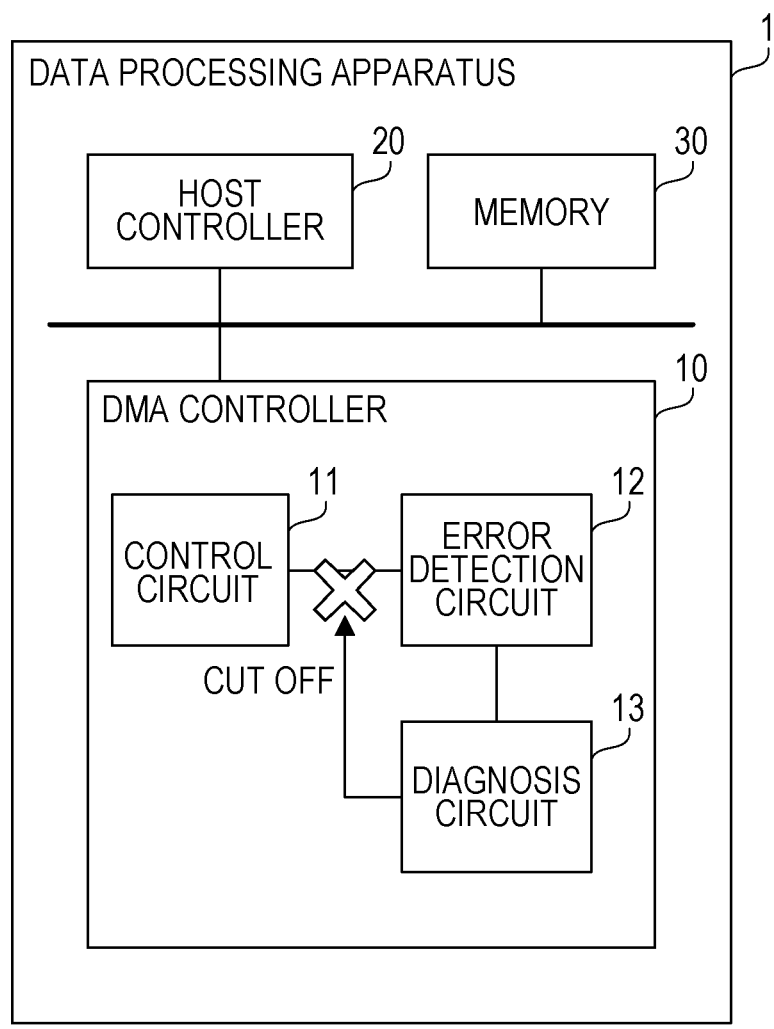
FIG. 1 is a diagram illustrating a data processing apparatus according to a first embodiment.

FIG. 1 is a diagram illustrating a data processing apparatus according to the first embodiment.

A data processing apparatus 1 includes a DMA controller 10, a host controller 20 and a memory 30. The DMA controller 10, the host controller 20 and the memory 30 are connected to a bus of the data processing apparatus 1.

The DMA controller 10 performs a DMA data transfer (DMA transfer) between a device (not illustrated) such as a peripheral device included in the data processing apparatus 1 and the memory 30. The DMA controller 10 may perform the data transfer from one storage area to another storage area in the memory 30.

The host controller 20 is a host controller for the DMA controller 10 and is, for example, a processor using a CPU. The host controller 20 may be configured by a processor that executes a program of firmware, for example, a field-programmable gate array (FPGA). The processor may also include a set of multiple processors (multiprocessor).

The memory 30 is a main memory device (main memory) of the data processing apparatus 1. The memory 30 is, for example, a RAM.

The DMA controller 10 includes a control circuit 11, an error detection circuit 12 and a diagnosis circuit 13.

The control circuit 11 controls a DMA transfer of data. When performing the DMA transfer of a piece of data, the control circuit 11 acquires an error detection result of the data by the error detection circuit 12 and continues the DMA transfer of the data when no error is detected. On the other hand, when the error detection circuit 12 detects an error, the control circuit 11 interrupts the DMA transfer and notifies the host controller 20 that the error is detected. The control circuit 11 waits for post-processing (for example, a reset of the control circuit 11, a retransfer instruction, and the like) after the error detection by the host controller 20. The control circuit 11 retransfers the data in which the error is detected in response to the retransfer instruction by the host controller 20.

The error detection circuit 12 performs the error detection on data to be transferred. A character for error detection is assigned to the data to be transferred. The error detection circuit 12 detects an error of the data to be transferred by a predetermined operation based on the data to be transferred and the character for error detection. The error detection circuit 12 outputs the result of the error detection to the control circuit 11.

The character for error detection includes, for example, a BCC. The BCC is information used to validate the legitimacy of a logical data block. The BCC includes a redundancy character (CRC: Cyclic Redundancy Check) for detecting an abnormality in data, and position information (BID: Block Identifier) for checking a logical data position of a data block. However, the error detection circuit 12 may perform an error detection using another type of redundancy character (redundant bit or redundant bit string).

The diagnosis circuit 13 diagnoses the operation of the error detection by the error detection circuit 12. For example, the diagnosis circuit 13 incorporates a storage unit (not illustrated). The storage unit in the diagnosis circuit 13 stores diagnosis data. The diagnosis data is used to diagnose the operation of the error detection by the error detection circuit 12. For example, diagnosis data is stored in advance in the storage unit of the diagnosis circuit 13. The diagnosis data includes first diagnosis data and second diagnosis data.

The first diagnosis data is a set of first data and a BCC generated for the first data. The second diagnosis data is, for example, a second set of second data and a BCC generated for data other than the second data (the first data or the third data). The first data in the first diagnosis data may be normal data because it is determined that there is no error when the error detection circuit 12 operates properly (normally). The second data in the second diagnosis data may be abnormal data because it is determined that there is an error when the error detection circuit 12 operates properly (normally).

The diagnosis circuit 13 disconnects between the control circuit 11 and the error detection circuit 12 to diagnose the operation of the error detection circuit 12. For example, the diagnosis circuit 13 disconnects connection between the control circuit 11 and the error detection circuit 12 when the DMA controller 10 is in the idle state. The idle state is a state in which the DMA controller 10 is not used for the DMA transfer in the normal operation. The diagnosis circuit 13 inputs the first diagnosis data or the second diagnosis data to the error detection circuit 12 and obtains a response from the error detection circuit 12 to diagnose the error detection circuit 12.

After the diagnosis circuit 13 obtains a response to the first diagnosis data or the second diagnosis data, the diagnosis circuit 13 reconnects the control circuit 11 and the error detection circuit 12 (cancels the disconnected state). The control circuit 11 may perform the normal DMA transfer again using the error detection circuit 12.

The host controller 20 performs a process at the time of abnormality according to the diagnosis result by the diagnosis circuit 13. For example, when the host controller 20 determines that the error detection circuit 12 is not properly operating, the host controller 20 performs a predetermined FATAL process for the DMA controller 10 (for example, a reactivation of the DMA controller 10). On the other hand, when the host controller 20 determines that the error detection circuit 12 is operating properly, the host controller 20 continues the operation by the DMA controller 10. The following method may be conceivable to determine whether the operation of the error detection circuit 12 by the host controller 20 is proper.

As a first example, the host controller 20 may acquire, from the diagnosis circuit 13, a response from the error detection circuit 12 when the diagnosis circuit 13 sequentially inputs to the error detection circuit 12 alternately and sequentially normal data, abnormal data, normal data, . . . . In this case, the host controller 20 determines that the error detection circuit 12 is properly operating when the response is correctly obtained in the order of error absence response, error presence response, error absence response, . . . , and the error detection circuit 12 is not properly operating when the response is not correctly obtained.

As a second example, in addition to the method of the first example, in order to make it possible to properly validate the time series of the response, the diagnosis circuit 13 may assign time information indicating the response time to the response from the error detection circuit 12, and the host controller 20 may acquire the response and the response time. When the host controller 20 validates that error absence response, error presence response, error absence response, . . . are obtained in this order, the host controller 20 may validate the order of the time series taking the time information into consideration.

As a third example, according to the method of the first example, the diagnosis circuit 13 determines whether the error detection circuit 12 is operating properly, and the host controller 20 acquires the determination result by the diagnosis circuit 13. When the host controller 20 receives a notification from the diagnosis circuit 13 that the error detection circuit 12 is not operating properly, the host controller 20 performs a process at the time of abnormality for the DMA controller 10. On the other hand, when the host controller 20 receives a notification from the diagnosis circuit 13 that the error detection circuit 12 is operating properly, the host controller 20 continues the operation by the DMA controller 10.

According to the data processing apparatus 1, the diagnosis circuit 13 disconnects between the control circuit 11 and the error detection circuit 12. The diagnosis circuit 13 diagnoses the operation of the error detection circuit 12. The host controller 20 performs a process at the time of abnormality according to the diagnosis result by the diagnosis circuit 13.

This enables an efficient diagnosis of the error detection function.

For example, the diagnosis of the error detection circuit 12 is performed by the diagnosis circuit 13 of the DMA controller 10, so that no load of the diagnosis is imposed on the host controller 20, and the degradation in system performance during the normal operation may be suppressed. When diagnosis is performed by the host controller 20 itself, diagnosis data is disposed in the memory 30. However, the present embodiment makes it possible to save the storage area of the memory 30 because the diagnosis data is stored in the diagnosis circuit 13.

For example, by disconnecting between the control circuit 11 and the error detection circuit 12 at the time of diagnosis, the diagnosis circuit 13 may suppress the output to the control circuit 11 of the result of the error detection by the error detection circuit 12.

When the connection between the control circuit 11 and the error detection circuit 12 is not disconnected, the response (error presence response) by the error detection circuit 12 to the abnormal data is output to the control circuit 11. As in the normal DMA transfer, the control circuit 11 interrupts the operation of the DMA transfer, notifies the host controller 20 of the presence of an error, and waits for a reset and a retransfer instruction by the host controller 20. The series of processes takes time, which causes the degradation in system performance.

Therefore, as described above, the diagnosis circuit 13 suppresses the output to the control circuit 11 of the result of the error detection by the error detection circuit 12, so that unnecessary notification from the control circuit 11 to the host controller 20 may be suppressed. As a result, it is possible not to induce post-processing by the host controller 20 in the case of presence of is an error. Thus, the degradation in system performance may be further suppressed.

In this way, the data processing apparatus 1 makes it possible to perform the efficient diagnosis of the error detection function. There is also an advantage that the diagnosis function may be incorporated into the DMA controller 10 while suppressing the influence on the existing functions of the control circuit 11 (for example, without changing the control circuit 11).

The data processing apparatus 1 may be applied to various devices. Examples of the data processing apparatus 1 may include a computer, various information processing devices including a terminal device such as a smartphone and a tablet, and a storage device, and an electronic device. In the following, a storage device is illustrated as an example of the data processing apparatus 1, and a diagnosis function of the error detection will be described in more detail.

Second Embodiment

Next, a second embodiment will be described.

Figure 2:
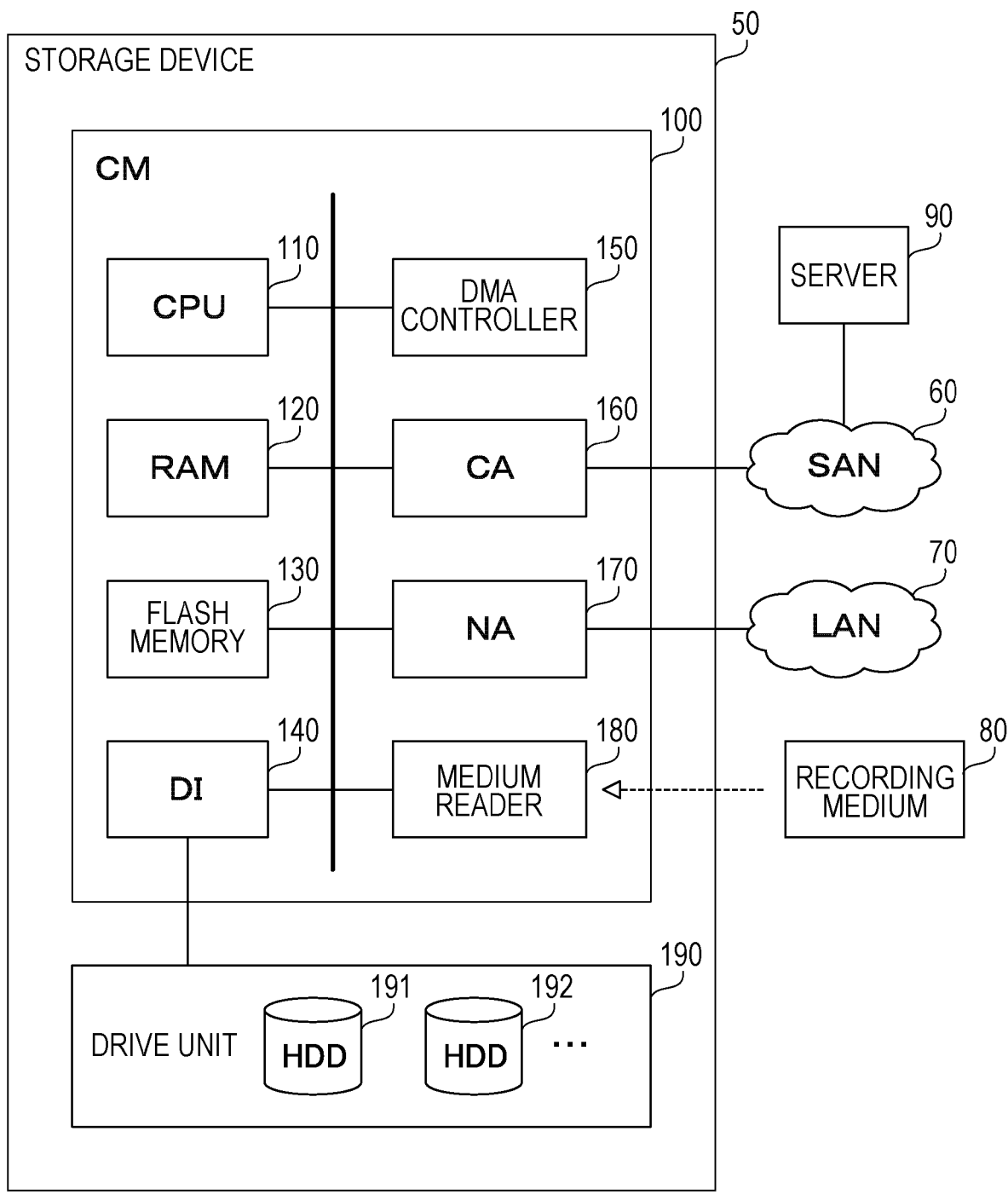
FIG. 2 is a diagram illustrating an example of hardware of a storage device according to a second embodiment.

FIG. 2 is a diagram illustrating an example of hardware of a storage device according to the second embodiment.

A storage device 50 accommodates a plurality of memory devices such as a hard disk drive (HDD) and a solid state drive (SSD), and provides a server 90 with a large-capacity storage area. The storage device 50 includes a controller module (CM) 100. The CM 100 controls the access of the server 90 to the memory device accommodated in the storage device 50. The CM 100 may be referred to as a storage control device.

The CM 100 includes a CPU 110, a RAM 120, a flash memory 130, a DI 140, a DMA controller 150, a channel adapter (CA) 160, a network adapter (NA) 170, and a medium reader 180. These pieces of hardware are connected to the bus in the CM 100.

The CPU 110 is an example of the host controller 20 according to the first embodiment. The RAM 120 is an example of the memory 30 according to the first embodiment. The DMA controller 150 corresponds to the DMA controller 10 of the first embodiment.

The CPU 110 is a processor that executes program instructions. The CPU 110 loads at least part of the program and data stored in the flash memory 130 into the RAM 120 and executes the program. The CPU 110 may include a plurality of processor cores. The CM 100 may have a plurality of processors. The processing of the CPU 110 described below may be performed in parallel using a plurality of processors or processor cores. A set of multiple processors may be referred to as a "multiprocessor" or simply a "processor".

The RAM 120 is a volatile semiconductor memory that temporarily stores a program of firmware executed by the CPU 110 and data used for computation by the CPU 110. The CM 100 may include a type of memory other than the RAM, and may include a plurality of memories.

The flash memory 130 is a non-volatile memory device that stores a program of firmware and data. The CM 100 may include a plurality of non-volatile memory devices.

The DI 140 is an interface for communicating with a drive unit 190. For example, an interface such as a serial attached SCSI (SAS) (SCSI is an abbreviation for small computer system interface) may be used as the DI 140. The drive unit 190 is built in the storage device 50, and accommodates HDDs 191, 192, . . . . The drive unit 190 may also accommodate other types of memory devices such as an SSD, instead of or in combination with the HDD.

The DMA controller 150 controls DMA transfer of data between the RAM 120 and other devices (such as the DI 140, the CA 160, the NA 170, and the medium reader 180), or from one area to another area of the RAM 120. At the time of data transfer, the DMA controller 150 performs an error detection by the BCC assigned to data. The DMA controller 150 may be abbreviated as DMAC. The function of the DMA controller 150 is implemented by, for example, a field-programmable gate array (FPGA).

The CA 160 is a communication interface connected to a storage area network (SAN) 60. The CA 160 communicates with the server 90 connected to the SAN 60 via the SAN 60. For example, a fibre channel (FC) interface may be used as the CA 160.

The NA 170 is a communication interface that communicates with another computer via a local area network (LAN) 70. For example, an Ethernet (registered trademark) interface may be used as the NA 170.

The medium reader 180 reads a program and data stored in a recording medium 80. For example, a nonvolatile semiconductor memory such as a flash memory card may be used as the recording medium 80. The medium reader 180 stores the program and data read from the recording medium 80 in the RAM 120 and the flash memory 130, for example, in accordance with an instruction from the CPU 110.

The storage device 50 may include a plurality of CMs. For example, the storage device 50 distributes and performs data access with the CMs as a redundant configuration, thereby achieving high-speed data access. When one CM fails, another CM takes over data access, thereby achieving high reliability.

Figure 3:
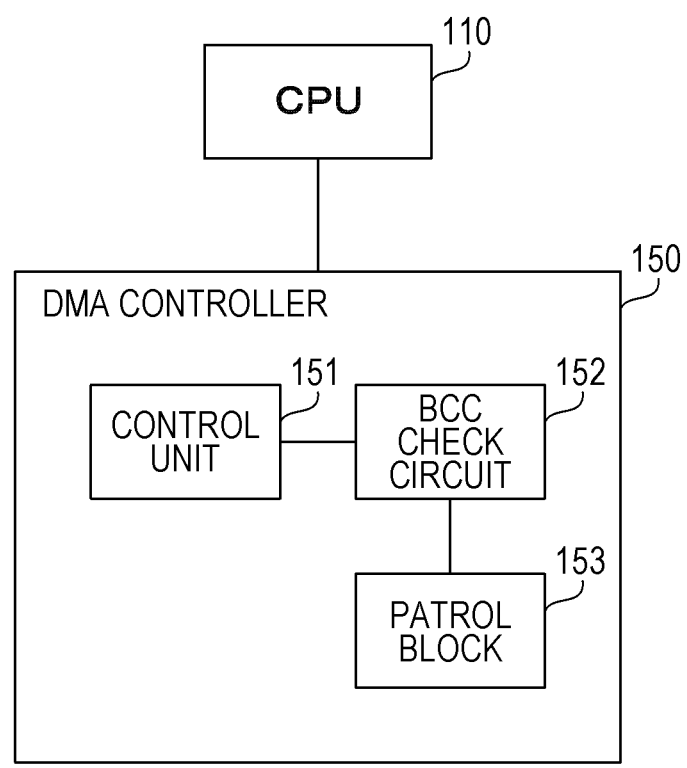
FIG. 3 is a diagram illustrating an example of hardware of a DMAC.

FIG. 3 is a diagram illustrating an example of hardware of the DMAC.

The DMA controller 150 includes a control unit 151, a BCC check circuit 152, and a patrol block 153. The control unit 151 corresponds to the control circuit 11 of the first embodiment. The BCC check circuit 152 corresponds to the error detection circuit 12 of the first embodiment. The patrol block 153 corresponds to the diagnosis circuit 13 of the first embodiment.

The control unit 151 is a circuit that controls DMA transfer of data. When performing the DMA transfer of data, the control unit 151 acquires an error detection result of the data by the BCC check circuit 152 and continues the DMA transfer of the data when no error is detected. On the other hand, when the BCC check circuit 152 detects an error, the control unit 151 interrupts the DMA transfer and notifies the CPU 110 that the error is detected. The control unit 151 waits for post-processing (for example, a reset of the control unit 151 (a reset of a predetermined register of the control unit 151), a retransfer instruction, and the like) after the error detection by the CPU 110. The control unit 151 may perform a retransfer of data in which an error is detected, in accordance with a retransfer instruction by the CPU 110.

The BCC check circuit 152 performs an error detection on data to be transferred. For example, the BCC is assigned in association with data to be transferred. The BCC may include a redundancy character (CRC) for detecting an abnormality of data and position information (BID) for checking a logical data position of a data block. The BCC check circuit 152 detects an error of data to be transferred by a predetermined operation based on the BCC. The error detection by the BCC check circuit 152 may be performed based on, for example, the CRC included in the BCC. The BCC check circuit 152 outputs the result of the error detection to the control unit 151.

The patrol block 153 is a circuit that diagnoses an error detection operation by the BCC check circuit 152. For example, the patrol block 153 includes a storage unit (not illustrated). The storage unit in the patrol block 153 stores diagnosis data. The diagnosis data is used to diagnose an error detection operation by the BCC check circuit 152. For example, the diagnosis data is stored in advance in the storage unit of the patrol block 153. The diagnosis data includes first diagnosis data and second diagnosis data.

The first diagnosis data is a set of first data and a BCC generated for the first data. The second diagnosis data is, for example, a second set of second data and a BCC generated for data other than the second data (the first data or the third data). The first data in the first diagnosis data may be normal data because it is determined that there is no error (no error exists) when the BCC check circuit 152 operates properly. The second data in the second diagnosis data may be abnormal data because it is determined that there is an error (an error exists) when the BCC check circuit 152 operates properly.

The patrol block 153 disconnects between the control unit 151 and the BCC check circuit 152 and diagnoses the operation of the BCC check circuit 152. For example, the patrol block 153 disconnects between the control unit 151 and the BCC check circuit 152 when the DMA controller 150 is in the idle state. The idle state is a state in which the DMA controller 150 is not used for DMA transfer in the normal operation. The patrol block 153 inputs the first diagnosis data or the second diagnosis data to the BCC check circuit 152, and obtains a response of the BCC check result by the BCC check circuit 152 to diagnose the BCC check circuit 152.

After the patrol block 153 obtains a response to the first diagnosis data or the second diagnosis data, the patrol block 153 reconnects the control unit 151 and the BCC check circuit 152 (cancels the disconnected state). The control unit 151 may perform the normal DMA transfer again using the BCC check circuit 152.

The CPU 110 executes a process at the time of abnormality according to the diagnosis result by the patrol block 153. For example, when the CPU 110 determines that the BCC check circuit 152 is not properly operating, the CPU 110 performs a predetermined FATAL process for the DMA controller 150 (for example, a reactivation of the DMA controller 150). On the other hand, when the CPU 110 determines that the BCC check circuit 152 is operating properly, the CPU 110 continues the operation by the DMA controller 150. The function of the CPU 110 is implemented by the CPU 110 executing a program of firmware stored in the RAM 120.

Figure 4:
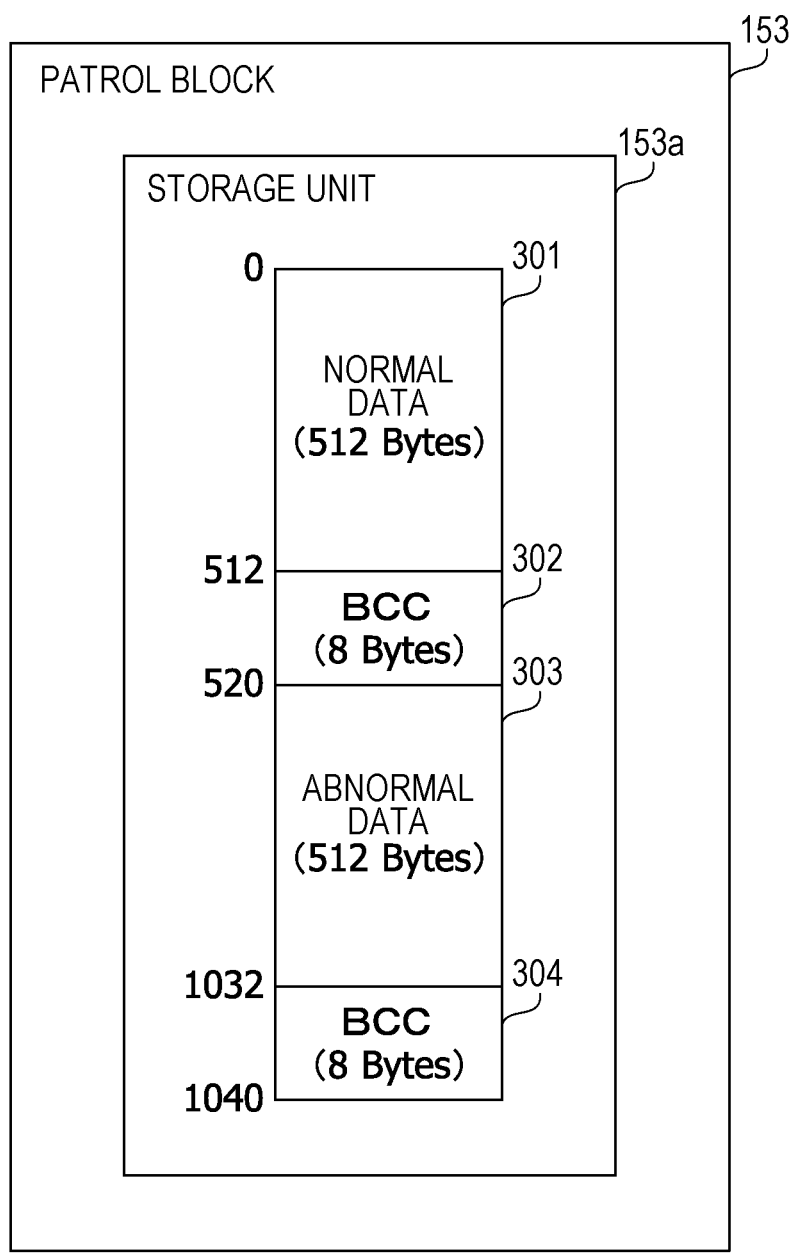
FIG. 4 is a diagram illustrating an example of diagnosis data.

FIG. 4 is a diagram illustrating an example of diagnosis data.

A storage unit 153*a* is incorporated in the patrol block 153. The storage unit 153*a* stores diagnosis data. The size of one piece of diagnosis data is 520 bytes. The diagnosis data includes first diagnosis data and second diagnosis data. The first diagnosis data is a set of normal data 301 and a BCC 302. The second diagnosis data is a set of abnormal data 303 and a BCC 304. The size of the normal data 301 is 512 bytes. The size of the BCC 302 is 8 bytes. The size of the abnormal data 303 is 512 bytes. The size of the BCC 304 is 8 bytes.

For example, the BCC 302 is generated by a predetermined operation on the normal data 301. For example, the abnormal data 303 is generated by modifying at least part of the normal data 301. The BCC 304 is, for example, identical to the BCC 302.

Figure 5:
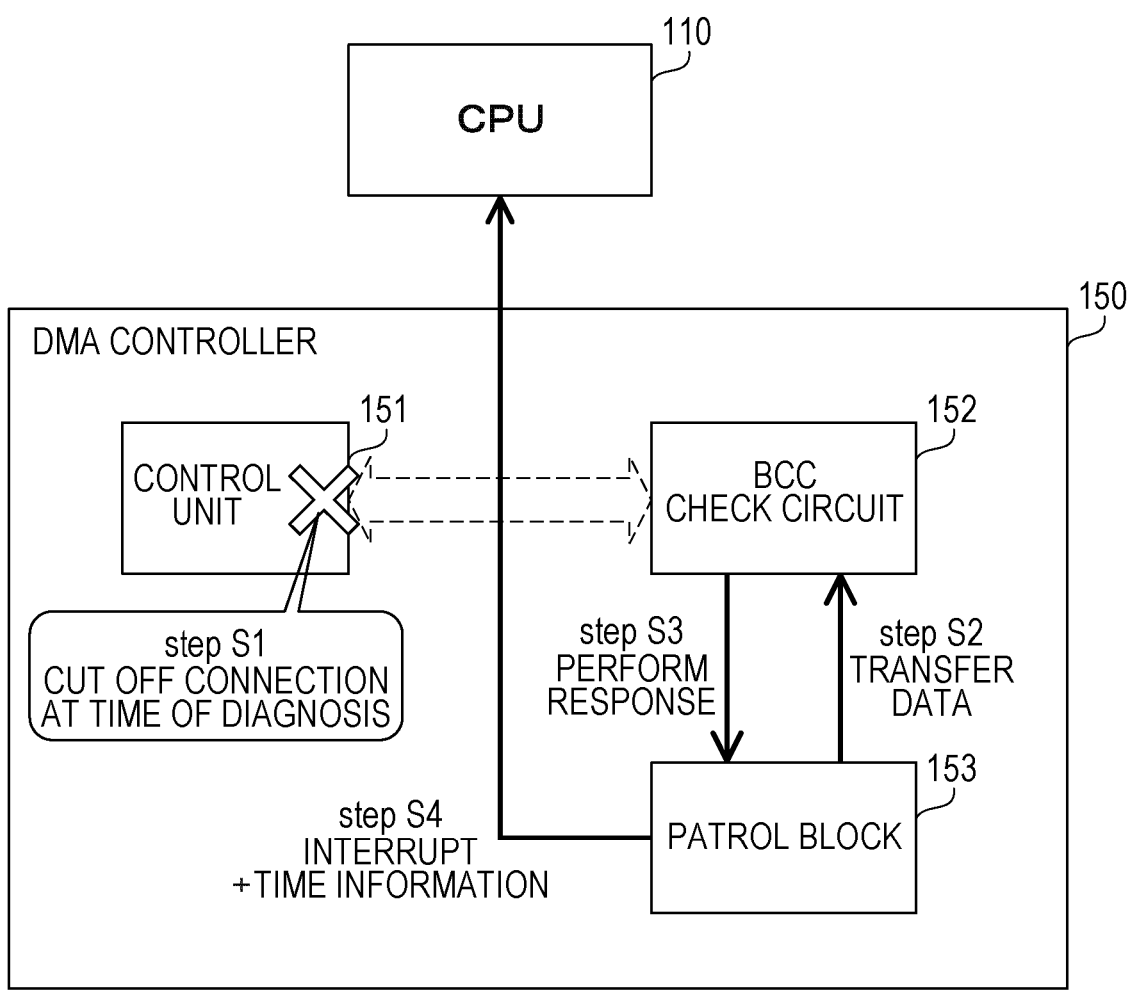
FIG. 5 is a diagram illustrating an example of diagnosis by a patrol block.

FIG. 5 is a diagram illustrating an example of diagnosis by a patrol block.

The patrol block 153 detects that the DMA controller 150 is in an idle state. The patrol block 153 disconnects between the control unit 151 and the BCC check circuit 152 (step S1).

The patrol block 153 transfers the diagnosis data stored in the storage unit 153*a* to the BCC check circuit 152, and causes the BCC check circuit 152 to perform an error detection based on the diagnosis data (step S2).

The patrol block 153 acquires, from the BCC check circuit 152, a response of the BCC check result (an error exists or no error exists) based on the diagnosis data (step S3). When an error is detected by the BCC check circuit 152, "an error exists" is indicated, and when no error is detected by the BCC check circuit 152, "no error exists" is indicated.

The patrol block 153 generates diagnosis information in which time information is assigned to the BCC check result (an error exists or no error exists), and makes an interrupt notification to the CPU 110 (step S4). The time information may be a time stamp, an ascending or descending count value, or the like.

The CPU 110 determines that the error detection function by the BCC check circuit 152 is normal when the BCC check results alternately indicate "no error exists" and "an error exists", and that the error detection function by the BCC check circuit 152 is abnormal in any other cases. For example, when the patrol block 153 inputs, to the BCC check circuit 152, the first diagnosis data and the second diagnosis data in this order, "no error exists" is indicated first and then "an error exists" is indicated, and after that indications of "no error exists" and "an error exists" are alternately repeated when the error detection function is normal.

At this time, the CPU 110 validates the time information together with the BCC check result notified by the patrol block 153. The CPU 110 determines that the error detection function (or diagnosis function) is normal when the current time information is ahead of the time of the previous notification, and that the error detection function (or diagnosis function) is abnormal in any other cases.

When detecting an abnormality based on the diagnosis information acquired from the patrol block 153, the CPU 110 executes a FATAL process for the DMA controller 150.

The patrol block 153 may not obtain the BCC check result based on the diagnosis data from the BCC check circuit 152 within a predetermined time. In this case, the patrol block 153 outputs, to the CPU 110, only the interrupt notification not including the BCC check result. The CPU 110 determines that "no BCC check result exists" with respect to the interrupt notification.

Next, processing procedures of the CPU 110 and the DMA controller 150 will be described. As described above, the function of the CPU 110 is implemented by the firmware executed by the CPU 110. The patrol block 153 inputs, to the BCC check circuit 152, the first diagnosis data and the second diagnosis data in this order at the time of diagnosis.

Figure 6:
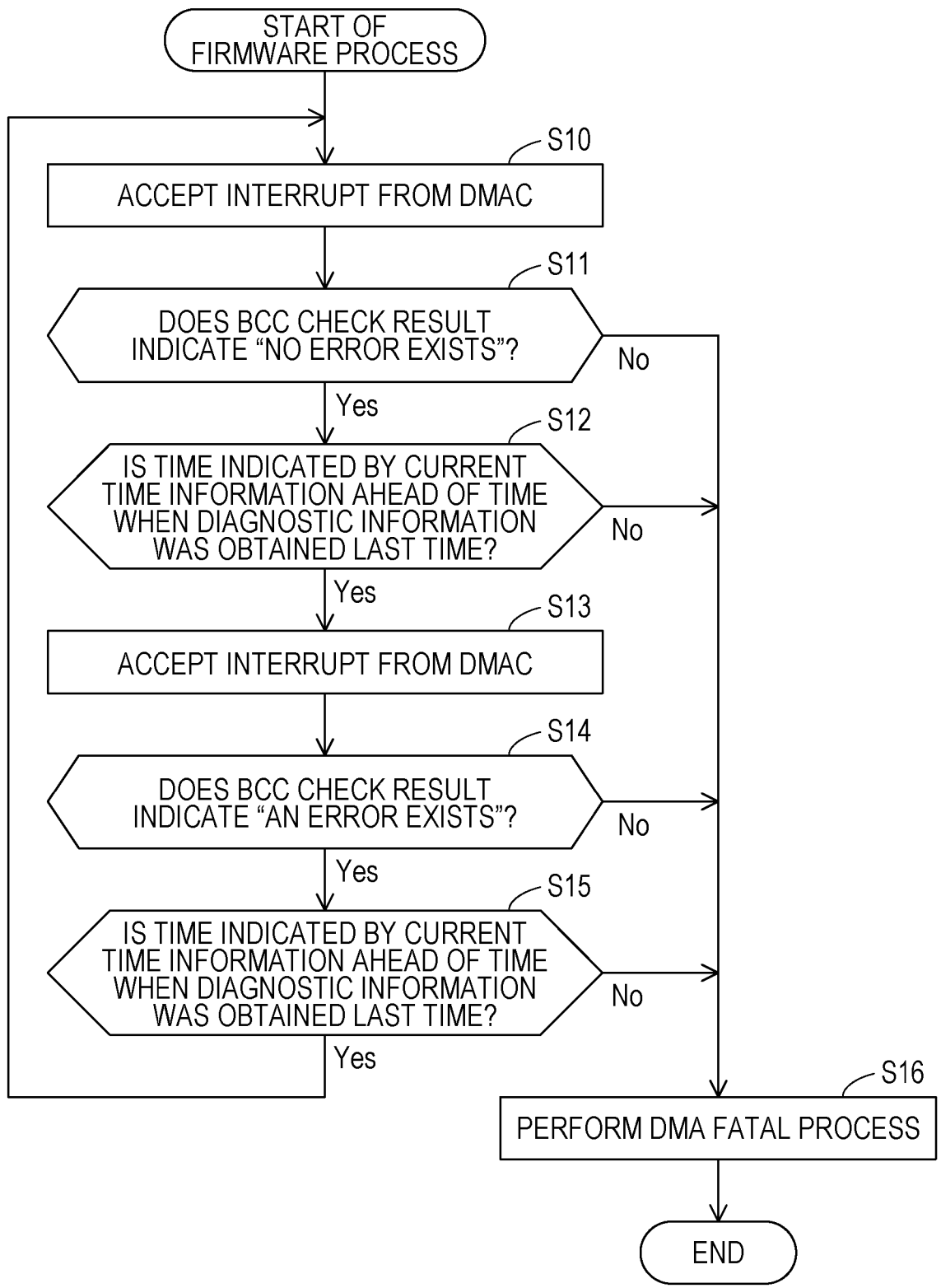
FIG. 6 is a flowchart illustrating an example of a process of firmware.

FIG. 6 is a flowchart illustrating an example of a process of firmware.

In step S10, the CPU 110 receives an interrupt from the DMA controller 150. The CPU 110 acquires diagnosis information from the DMA controller 150. The diagnosis information includes a BCC check result and time information as described above.

In step S11, the CPU 110 determines whether the BCC check result indicates "no error exists". When "no error exists" is indicated, the process proceeds to step S12. When "no error exists" is not indicated, (that is, "an error exists" or "no BCC check result exists"), the process proceeds to step S16.

In step S12, based on the time information included in the diagnosis information, the CPU 110 determines whether the time indicated by the current time information (the time information acquired in step S10) is ahead of the time when the diagnosis information was acquired last time. When the time indicated by the current time information is ahead of the time when the diagnosis information was acquired last time, the process proceeds to step S13. When the time indicated by the current time information is not ahead of the time when the diagnosis information was acquired last time, the process proceeds to step S16.

In step S13, the CPU 110 receives an interrupt from the DMA controller 150. The CPU 110 acquires diagnosis information from the DMA controller 150. The diagnosis information includes the BCC check result and the time information.

In step S14, the CPU 110 determines whether the BCC check result indicates "an error exists". When "an error exists" is indicated, the process proceeds to step S15. When "an error exists" is not indicated (that is, "no error exists" or "no BCC check result exists"), the process proceeds to step S16.

In step S15, based on the time information included in the diagnosis information, the CPU 110 determines whether the time indicated by the current time information (the time information acquired in step S13) is ahead of the time when the diagnosis information was acquired last time. When the time indicated by the current time information is ahead of the time when the diagnosis information was acquired last time, the process proceeds to step S10. When the time indicated by the current time information is not ahead of the time when the diagnosis information was acquired last time, the process proceeds to step S16.

In step S16, the CPU 110 determines that the error detection function in the DMA controller 150 is abnormal, and executes the FATAL process for the DMA controller 150. The process of the firmware executed by the CPU 110 ends.

Figure 7:
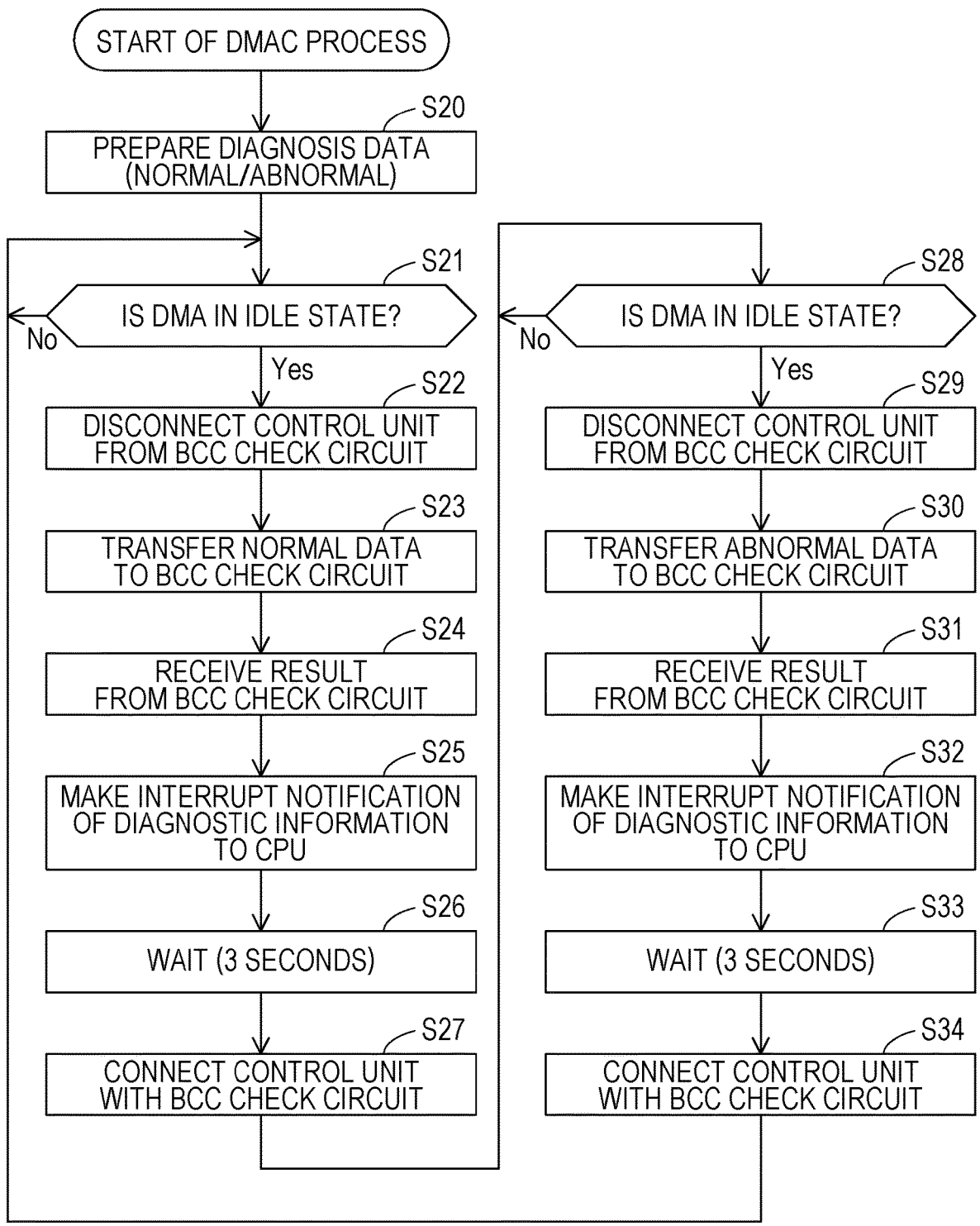
FIG. 7 is a flowchart illustrating an example of a process of the DMAC.

FIG. 7 is a flowchart illustrating an example of a process of the DMAC.

In step S20, the patrol block 153 prepares diagnosis data (normal/abnormal).

In step S21, the patrol block 153 determines whether the DMA controller 150 is in the idle state. When it is in the idle state, the process proceeds to step S22. When it is not in the idle state, the process proceeds to step S21, and the patrol block 153 waits until the DMA controller 150 is in the idle state.

In step S22, the patrol block 153 disconnects the control unit 151 from the BCC check circuit 152. For example, the patrol block 153 disconnects between the control unit 151 and the BCC check circuit 152.

In step S23, the patrol block 153 transfers the first diagnosis data including the normal data 301 and the BCC 302 to the BCC check circuit 152.

In step S24, the patrol block 153 receives the BCC check result from the BCC check circuit 152.

In step S25, the patrol block 153 generates diagnosis information in which time information is assigned to the current BCC check result, and makes an interrupt notification of the diagnosis information to the CPU 101.

In step S26, the patrol block 153 waits for a predetermined time (for example, 3 seconds).

In step S27, the patrol block 153 connects the control unit 151 and the BCC check circuit 152. For example, the patrol block 153 cancels the state in which the connection between the control unit 151 and the BCC check circuit 152 is disconnected, and enables the control unit 151 to perform the DMA transfer again using the BCC check circuit 152.

In step S28, the patrol block 153 determines whether the DMA controller 150 is in the idle state. When it is in the idle state, the process proceeds to step S29. When it is not in the idle state, the process proceeds to step S28, and the patrol block 153 waits until the DMA controller 150 is in the idle state.

In step S29, the patrol block 153 disconnects the control unit 151 from the BCC check circuit 152. For example, the patrol block 153 disconnected the connection between the control unit 151 and the BCC check circuit 152.

In step S30, the patrol block 153 transfers the second diagnosis data including the abnormal data 303 and the BCC 304 to the BCC check circuit 152.

In step S31, the patrol block 153 receives the BCC check result from the BCC check circuit 152.

In step S32, the patrol block 153 generates diagnosis information in which time information is assigned to the current BCC check result, and makes an interrupt notification of the diagnosis information to the CPU 101.

In step S33, the patrol block 153 waits for a predetermined time (for example, 3 seconds).

In step S34, the patrol block 153 connects the control unit 151 and the BCC check circuit 152. For example, the patrol block 153 cancels the state in which the connection between the control unit 151 and the BCC check circuit 152 is disconnected, and enables the control unit 151 to perform the DMA transfer again using the BCC check circuit 152. The process proceeds to step S21.

As described above, the patrol block 153 assigns time information indicating the time to the diagnosis result to make the notification to the CPU 110. The CPU 110 detects an abnormality of the BCC check circuit 152 based on the time information.

For example, the patrol block 153 alternately inputs, to the BCC check circuit 152, the first data determined that no error exists and the second data determined that an error exists when the BCC check circuit 152 is normal. The patrol block 153 notifies the CPU 110 of the diagnosis result including the error detection result sequentially responded by the BCC check circuit 152. The CPU 110 detects an abnormality of the BCC check circuit 152 based on the order of with and without error responses indicated by the error detection result. For example, the CPU 110 determines that there is no abnormality when the BCC check circuit 152 is performing an expected operation in which "no error exists" and "an error exists" are alternately indicated, and that there is an abnormality when the BCC check circuit 152 is not performing the expected operation.

In this way, the diagnosis of the BCC check circuit 152 is performed by the patrol block 153 of the DMA controller 150, so that no load of the diagnosis is imposed on the CPU 110, and the degradation in system performance during the normal operation may be suppressed. By storing diagnosis data in the patrol block 153, it is not required to dispose the diagnosis data in the RAM 120 as in the case where the CPU 110 mainly performs the diagnosis, so that the storage area of the RAM 120 may be saved.

For example, by disconnecting the connection between the control unit 151 and the BCC check circuit 152 at the time of diagnosis, the patrol block 153 may suppress the output to the control unit 151 of the result of the error detection by the BCC check circuit 152.

When the connection between the control unit 151 and the BCC check circuit 152 is not disconnected, the response (the response indicating that an error exists) of the BCC check circuit 152 to the abnormal data 303 is output to the control unit 151. As in the normal DMA transfer, the control unit 151 interrupts the DMA transfer operation, notifies the CPU 110 of the presence of an error, and waits for a reset and a retransfer instruction by the CPU 110. The series of processes takes time, which causes the degradation in system performance.

Therefore, as described above, the patrol block 153 suppresses the output to the control unit 151 of the result of the error detection by the BCC check circuit 152, so that unnecessary notification from the control unit 151 to the CPU 110 may be suppressed. As a result, it is possible not to induce post-processing by the CPU 110 in the case where an error exists. Thus, the degradation in system performance may be further suppressed.

The CPU 110 validates that the responses of "no error exists" and "an error exists" are repeated in time series based on the time information included in the diagnosis information, so that it is possible to determine that the patrol block 153 performs the diagnoses properly. For example, when the BCC check circuit 152 or the patrol block 153 is not operating properly, although a notification of the diagnosis information is given to the CPU 110, the time information included in the diagnosis information may be notified to the CPU 110 without updating. The CPU 110 may properly detect such an abnormality of the BCC check circuit 152 and the patrol block 153 by validating the time information.

In this way, the DMA controller 150 makes it possible to perform the efficient diagnosis of the error detection function. There is also an advantage that the diagnosis function may be incorporated into the DMA controller 150 while suppressing the influence on the existing functions of the control unit 151 (for example, without changing the control unit 151).

Furthermore, the patrol block 153 reconnects the control unit 151 and the BCC check circuit 152 when the diagnosis of the operation of the BCC check circuit 152 is completed, so that normal DMA transfer may be properly performed after the diagnosis.

In the above example, the CPU 110 determines whether there is an abnormality in the error detection function of the DMA controller 150 based on the diagnosis information, but the determination may be performed by the patrol block 153. Therefore, hereinafter, an example will be described in which the patrol block 153 determines whether there is an abnormality in the error detection function.

Figure 8:
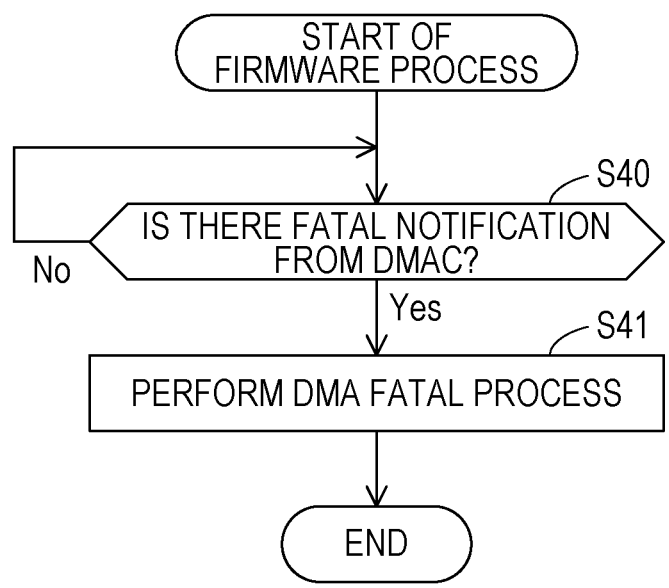
FIG. 8 is a flowchart illustrating an another example of a process of the firmware.

FIG. 8 is a flowchart illustrating an another example of a process of the firmware.

In step S40, the CPU 110 determines whether there is a FATAL notification from the DMA controller 150. When there is the FATAL notification, the process proceeds to step S41. When there is no FATAL notification, the process proceeds to step S40. The FATAL notification is output from the patrol block 153 to the CPU 110 when an abnormality of the error detection function of the BCC check circuit 152 is detected in the patrol block 153.

In step S41, the CPU 110 executes a FATAL process for the DMA controller 150. The process of the firmware executed by the CPU 110 ends.

Figure 9:
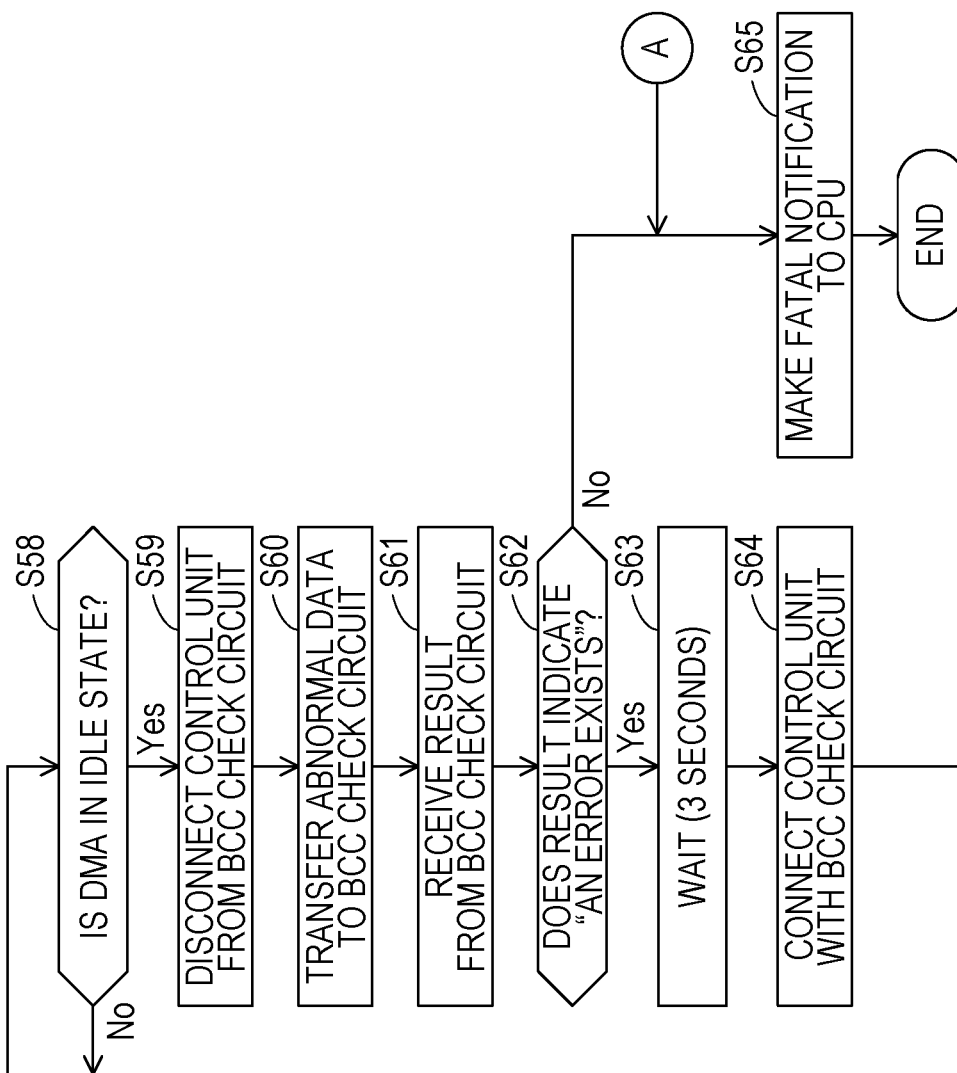
FIG. 9 is a flowchart illustrating another example of a process of the DMAC.

FIG. 9 is a flowchart illustrating another example of a process of the DMAC.

In step S50, the patrol block 153 prepares diagnosis data (normal/abnormal).

In step S51, the patrol block 153 determines whether the DMA controller 150 is in the idle state. When it is in the idle state, the process proceeds to step S52. When it is not in the idle state, the process proceeds to step S51, and the patrol block 153 waits until the DMA controller 150 is in the idle state.

In step S52, the patrol block 153 disconnects the control unit 151 from the BCC check circuit 152. For example, the patrol block 153 disconnects between the control unit 151 and the BCC check circuit 152.

In step S53, the patrol block 153 transfers the first diagnosis data including the normal data 301 and the BCC 302 to the BCC check circuit 152.

In step S54, the patrol block 153 receives the BCC check result from the BCC check circuit 152.

In step S55, the patrol block 153 determines whether the BCC check result indicates "no error exists". When "no error exists" is indicated, the process proceeds to step S56. When "no error exists" is not indicated (that is, "an error exists" or "no BCC check result exists"), the process proceeds to step S65. When "no error exists" is responded, it means that the operation that the BCC check circuit 152 is expected to perform when the first diagnosis data is input is performed. When "no error exists" is not responded, it means that the operation that the BCC check circuit 152 is expected to perform when the first diagnosis data is input is not performed.

In step S56, the patrol block 153 waits for a predetermined time (for example, 3 seconds).

In step S57, the patrol block 153 connects the control unit 151 and the BCC check circuit 152. For example, the patrol block 153 cancels the state in which the connection between the control unit 151 and the BCC check circuit 152 is disconnected, and enables the control unit 151 to perform the DMA transfer again using the BCC check circuit 152.

In step S58, the patrol block 153 determines whether the DMA controller 150 is in the idle state. When it is in the idle state, the process proceeds to step S59. When it is not in the idle state, the process proceeds to step S58, and the patrol block 153 waits until the DMA controller 150 is in the idle state.

In step S59, the patrol block 153 disconnects the control unit 151 from the BCC check circuit 152. For example, the patrol block 153 disconnects between the control unit 151 and the BCC check circuit 152.

In step S60, the patrol block 153 transfers the second diagnosis data including the abnormal data 303 and the BCC 304 to the BCC check circuit 152.

In step S61, the patrol block 153 receives the BCC check result from the BCC check circuit 152.

In step S62, the patrol block 153 determines whether the BCC check result indicates "an error exists". When "an error exists" is indicated, the process proceeds to step S63. When "an error exists" is not indicated (that is, "no error exists" or "no BCC check result exists"), the process proceeds to step S65. When "an error exists" is responded, it means that the operation that the BCC check circuit 152 is expected to perform when the second diagnosis data is input is performed. When "an error exists" is not responded, it means that the operation that the BCC check circuit 152 is expected to perform when the second diagnosis data is input is not performed.

In step S63, the patrol block 153 waits for a predetermined time (for example, 3 seconds).

In step S64, the patrol block 153 connects the control unit 151 and the BCC check circuit 152. For example, the patrol block 153 cancels the state in which the connection between the control unit 151 and the BCC check circuit 152 is disconnected, and enables the control unit 151 to perform the DMA transfer again using the BCC check circuit 152. The process proceeds to step S51.

In step S65, the patrol block 153 outputs the FATAL notification to the CPU 110. The process of the DMA controller 150 ends.

That is, the patrol block 153 inputs the normal data or the abnormal data and the BCC into the BCC check circuit 152 to determine whether the error detection result for the input data by the BCC check circuit 152 is proper. The patrol block 153 notifies the CPU 110 of a diagnosis result indicating an abnormality when the result is not proper.

In this way, the patrol block 153 may determine the abnormality of the error detection function by the BCC check circuit 152 based on the BCC check result. In this way, part of the determination process by the CPU 110 may be omitted, so the load on the CPU 110 involving the diagnosis of the BCC check circuit 152 may be further reduced, and the degradation in system performance may be suppressed.

In steps S55 and S62, the patrol block 153 may also advance the process to step S65 when the BCC check result based on the diagnosis data may not be obtained from the BCC check circuit 152 within a predetermined time.

Next, an example (comparative example) of the diagnosis of the BCC check circuit in the DMA controller not provided with the patrol block 153 will be described.

Figure 10:
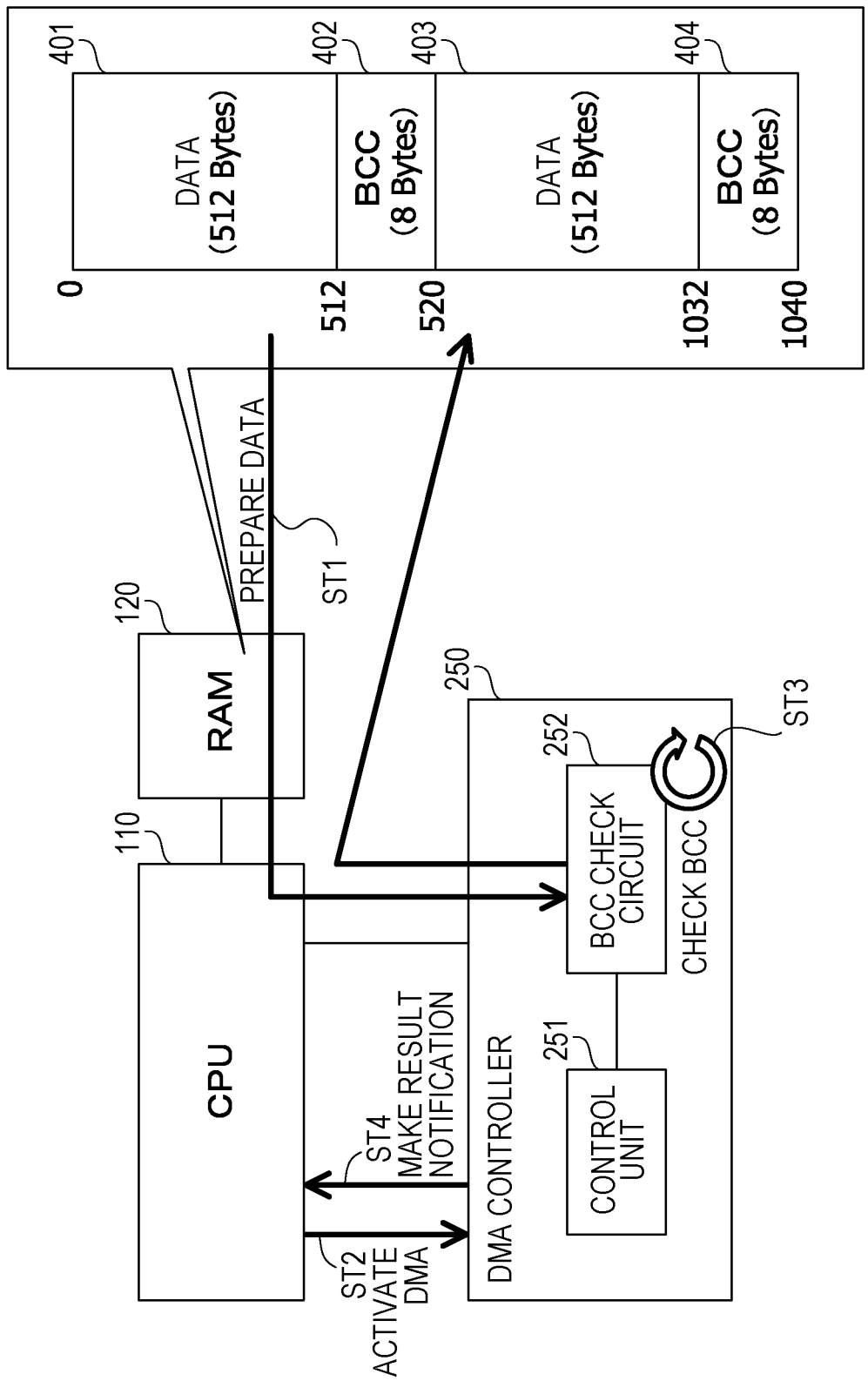
FIG. 10 is a diagram illustrating a comparative example of a diagnosis of a BCC check circuit.

FIG. 10 is a diagram illustrating a comparative example of a diagnosis of the BCC check circuit.

A DMA controller 250 includes a control unit 251 and a BCC check circuit 252. The DMA controller 250 differs from the DMA controller 150 in that it does not have the patrol block 153. The control unit 251 has the same function as the control unit 151. The BCC check circuit 252 has the same function as the BCC check circuit 152.

In the comparative example, the diagnosis of the BCC check circuit 252 is performed by the function of the firmware executed by the CPU 110. For example, the CPU 110 diagnoses the BCC check circuit 252 according to the following procedure.

First, the CPU 110 prepares diagnosis data in the RAM 120 (step ST1). The diagnosis data may be stored in advance in the flash memory 130 or may be created from existing data by the CPU 110. The diagnosis data includes first diagnosis data and second diagnosis data. The first diagnosis data is a set of normal data 401 and a BCC 402. The second diagnosis data is a set of abnormal data 403 and a BCC 404. The size of each piece of the normal data 401 and the abnormal data 403 is 512 bytes. The size of each of the BCCs 402 and 404 is 8 bytes.

For example, the BCC 402 is generated by a predetermined operation on the normal data 401. For example, the abnormal data 403 is generated by modifying at least part of the normal data 401. The BCC 404 is, for example, identical to the BCC 402.

Next, the CPU 110 activates the DMA controller 250 and inputs the diagnosis data to the DMA controller 250 (step ST2). The BCC check circuit 252 performs BCC check processing on the diagnosis data (step ST3). As in the case of performing the normal DMA transfer, the control unit 251 acquires the BCC check result according to the BCC check process from the BCC check circuit 252 and notifies the CPU 110 of the BCC check result (step ST4). The CPU 110 determines whether the error detection function of the DMA controller 250 is operating properly based on the BCC check result.

In step ST4, since the BCC check result of the first diagnosis data including the normal data 401 indicates "no error exists", the control unit 251 performs a DMA transfer of the normal data 401 (for example, a DMA transfer from one area to another area of the RAM 120). Since the DMA-transferred normal data 401 is diagnosis data, it may be discarded thereafter.

In step ST4, the BCC check result of the second diagnosis data including the abnormal data 403 indicates "an error exists". Therefore, the control unit 251 interrupts the DMA transfer. When the CPU 110 validates that the BCC check result for the abnormal data 403 indicates "an error exists", the CPU 110 performs post-processing (error recovery processing) at the time of the error for the DMA controller 250. The post-processing is performed as follows.

Figure 11:
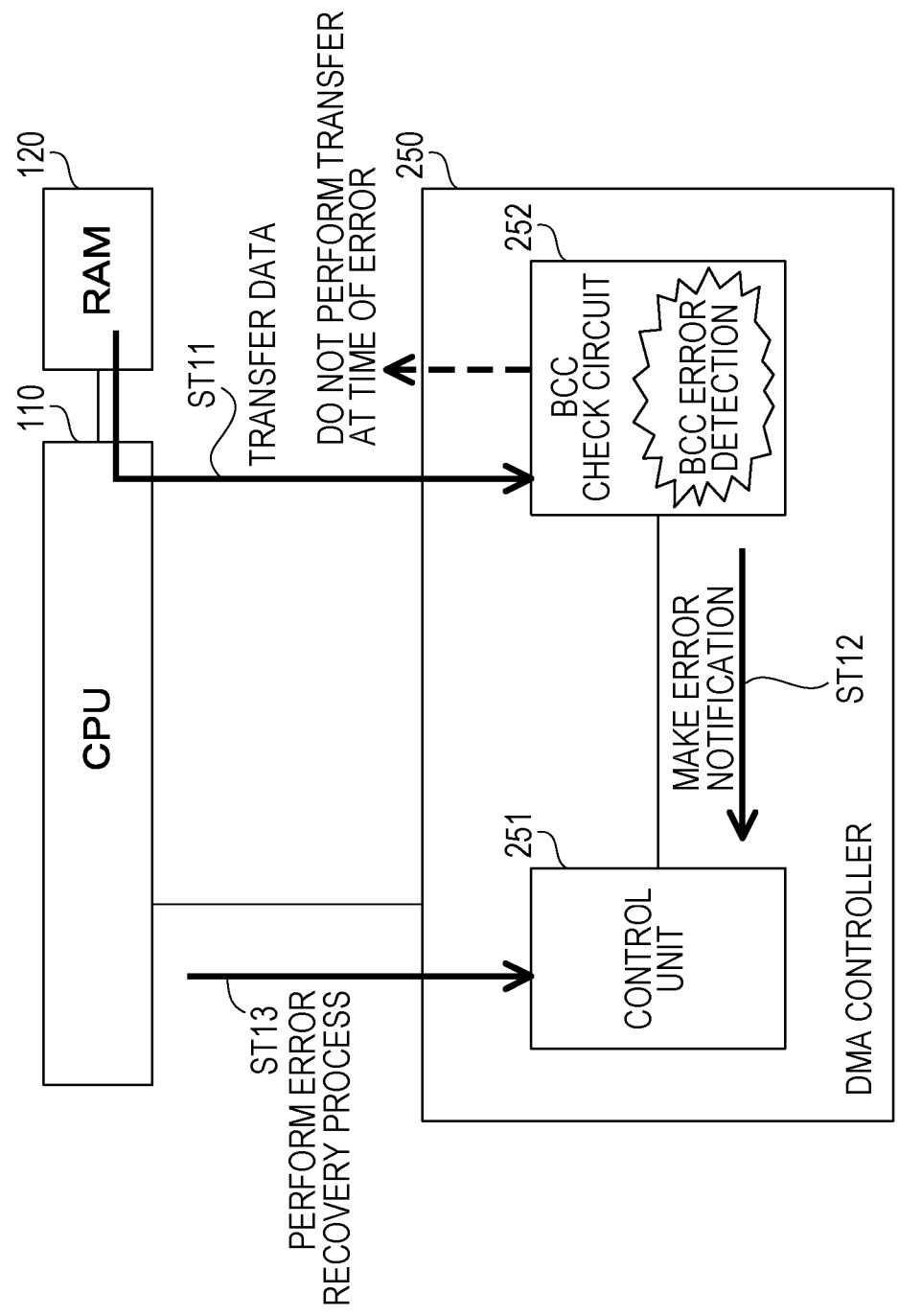
FIG. 11 is a diagram illustrating a comparative example of an operation at the time of detecting a BCC error.

FIG. 11 is a diagram illustrating a comparative example of an operation at the time of detecting a BCC error.

The CPU 110 transfers the second diagnosis data including the abnormal data 403 and the BCC 404 from the RAM 120 to the DMA controller 250 (step ST11). The BCC check circuit 252 detects a BCC error based on the abnormal data 403 and the BCC 404, and makes an error notification to the control unit 251 (step ST12). In this case, the control unit 251 interrupts the DMA transfer, and makes an error notification to the CPU 110 without performing the DMA transfer of the abnormal data 403. The CPU 110 executes an error recovery process of the control unit 251 (for example, error removal such as clearing a predetermined register in the control unit 251) in which the DMA transfer is suspended (step ST13).

Figure 12:
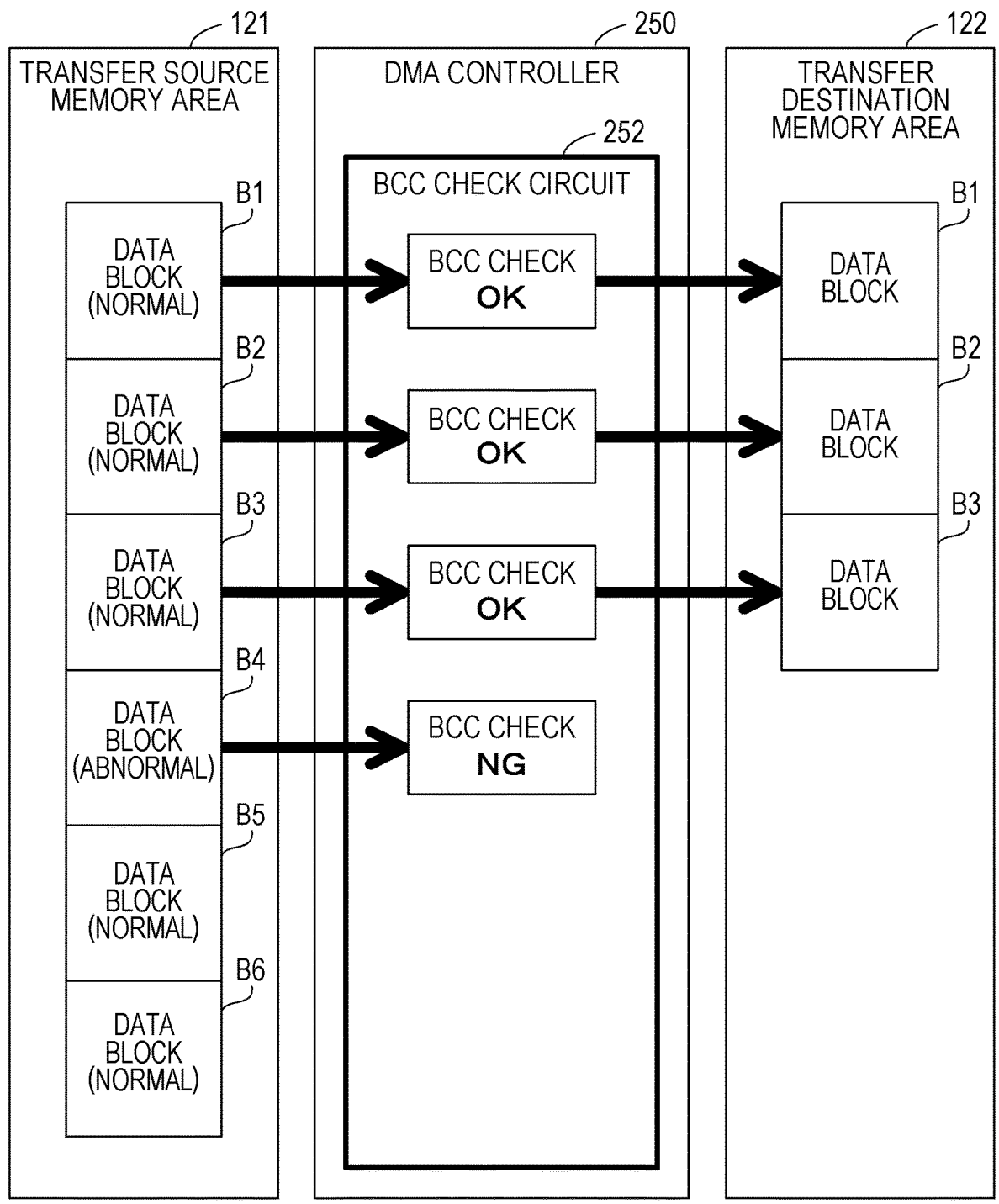
FIG. 12 is a diagram illustrating an example of an operation at the time of detecting a BCC error.

FIG. 12 is a diagram illustrating an example of an operation at the time of detecting a BCC error.

An example of the normal DMA transfer between the control unit 251 and the BCC check circuit 252 will be described. Although the control unit 251 and the BCC check circuit 252 will be described, the same behavior applies to the case where the connection between the control unit 151 and the BCC check circuit 152 is not cut off (when the normal DMA transfer is performed by the control unit 151).

The RAM 120 includes a transfer source memory area 121 and a transfer destination memory area 122. The transfer source memory area 121 is a storage area of the RAM 120 from which data is DMA-transferred. The transfer destination memory area 122 is a storage area of the RAM 120 to which data is DMA-transferred.

For example, data blocks B1, B2, B3, B4, B5, and B6 are stored in the transfer source memory area 121. The BCC is assigned to each of the data blocks B1, B2, B3, B4, B5, and B6 (not illustrated). The DMA controller 250 performs the DMA transfer of the data blocks B1, B2, B3, B4, B5, and B6 from the transfer source memory area 121 to the transfer destination memory area 122.

First, it is assumed that the data block B1 is normal, and the BCC check result by the BCC check circuit 252 indicates "no error exists" (OK). The DMA controller 250 DMA transfers the data block B1 from the transfer source memory area 121 to the transfer destination memory area 122.

Next, it is assumed that the data block B2 is normal, and the BCC check result by the BCC check circuit 252 indicates "no error exists" (OK). The DMA controller 250 DMA transfers the data block B2 from the transfer source memory area 121 to the transfer destination memory area 122.

Next, it is assumed that the data block B3 is normal, and the BCC check result by the BCC check circuit 252 indicates "no error exists" (OK). The DMA controller 250 DMA transfers the data block B3 from the transfer source memory area 121 to the transfer destination memory area 122.

It is assumed that the data block B4 is abnormal, and the BCC check result by the BCC check circuit 252 indicates "an error exists" (NG). The control unit 251 of the DMA controller 250 stops the DMA transfer without transferring the data block B4 and the subsequent data blocks, and notifies the CPU 110 that a BCC error exists.

The firmware of the CPU 110 causes the DMA controller 150 to perform a reset of a control unit 110 and issues a retransfer instruction to the DMA controller 150. As a result, the DMA controller 150 may perform the DMA transfer again. Next, the processing procedure of such a comparative example of such firmware will be described. The CPU 110 may implement the following procedure by executing the firmware of the comparative example.

Figure 13:
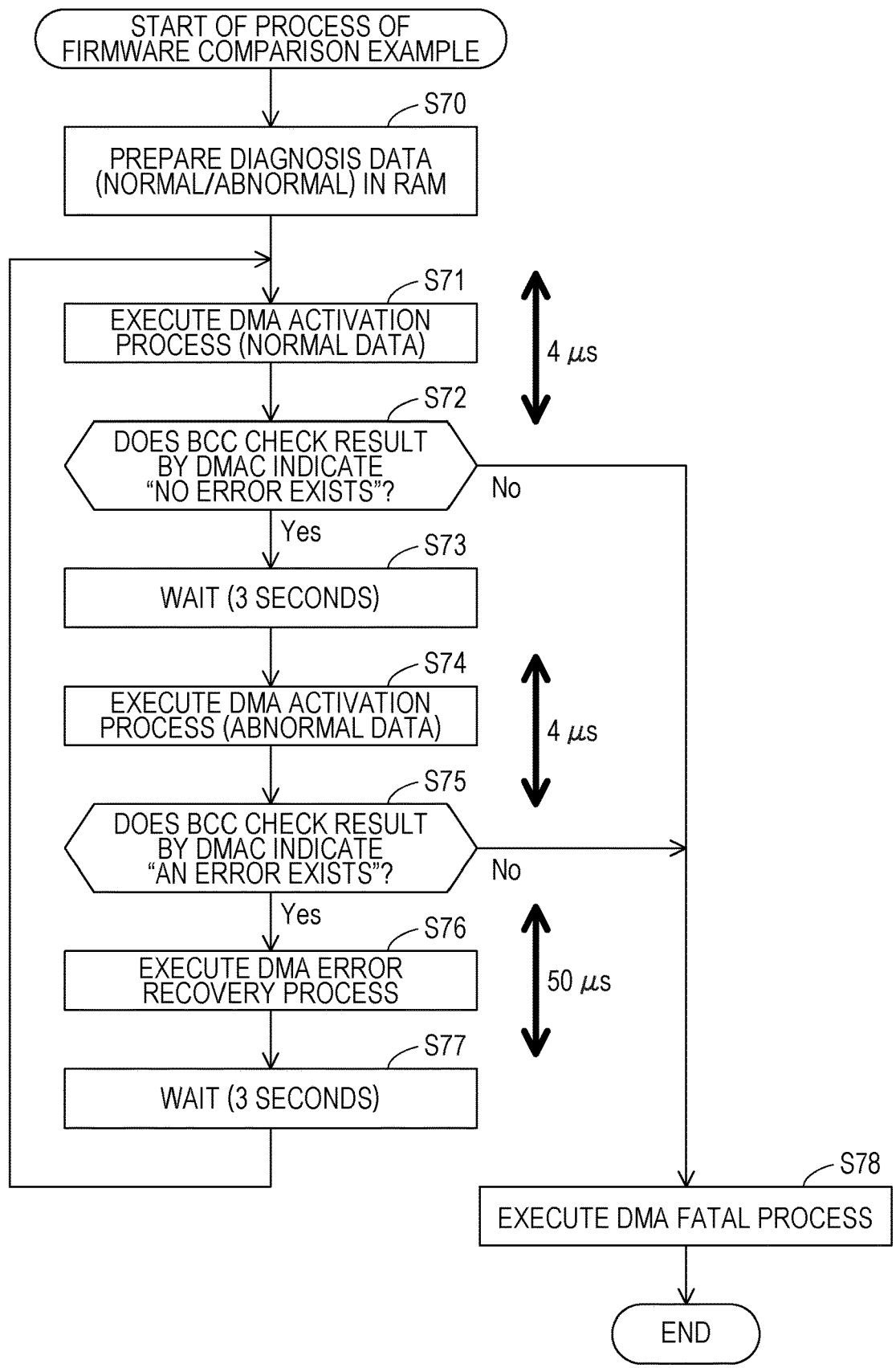
FIG. 13 is a flowchart illustrating a comparative example of a process of firmware.

FIG. 13 is a flowchart illustrating the comparative example of the process of the firmware.

In step S70, the CPU 110 prepares diagnosis data (normal/abnormal) in the RAM 120.

In step S71, the CPU 110 activates the DMA controller 250, and transfers the first diagnosis data (the normal data 401 and the BCC 402) from the RAM 120 to the DMA controller 250.

In step S72, the CPU 110 acquires, from the control unit 251, the BCC check result for the normal data 401 by the BCC check circuit 252. The CPU 110 determines whether the BCC check result indicates "no error exists". When "no error exists" is indicated, the process proceeds to step S73. When "an error exists" is indicated, the process proceeds to step S78.

In step S73, the CPU 110 waits for a predetermined time (for example, 3 seconds).

In step S74, the CPU 110 activates the DMA controller 250, and transfers the second diagnosis data (the abnormal data 403 and the BCC 404) from the RAM 120 to the DMA controller 250.

In step S75, the CPU 110 acquires, from the control unit 251, the BCC check result for the abnormal data 403 by the BCC check circuit 252. The CPU 110 determines whether the BCC check result indicates "an error exists". When "an error exists" is indicated, the process proceeds to step S76. When "no error exists" is indicated, the process proceeds to step S78.

In step S76, the CPU 110 executes a DMA error recovery process for the DMA controller 250. As described above, the DMA error recovery process includes a process (reset) of canceling an error state by accessing a predetermined register of the control unit 251, a retransfer instruction to the DMA controller 250, and the like.

In step S77, the CPU 110 waits for a predetermined time (for example, 3 seconds). The process proceeds to step S71.

In step S78, the CPU 110 determines that the error detection function in the DMA controller 250 is abnormal, and executes the FATAL process for the DMA controller 250. The process of the firmware of the comparative example executed by the CPU 110 ends.

The time required for step S71 is, for example, about 4 micro seconds (μs). The time required for step S74 is, for example, about 4 μs. The time required for step S76 is, for example, about 50 μs. When the BCC error occurs, the DMA controller 250 (and the DMA controller 150) transfers only the data block of "no error exists" in the BCC check, and does not transfer the data block of "an error exists". This is to suppress writing of abnormal data to the RAM 120. At this time, the DMA controller 250 (and the DMA controller 150) is in the BCC error detection state (stop state), and performs the recovery process (about 50 μs) as in step S76, and during this time, may not perform the DMA transfer process in the normal operation.

On the other hand, the DMA controller 150 performs the diagnosis of the BCC check circuit 152 using a self-patrol function of the patrol block 153 inside the DMA controller 150. For this reason, the load on the CPU 110 may be reduced, compared with the case where the firmware of the CPU 110 is used for the diagnosis as in the DMA controller 250 having no self-patrol function. Since the delay as in steps S71, S74, and S76 illustrated in FIG. 13 does not occur, it is possible to suppress the degradation in system performance of the normal operation. Furthermore, as illustrated in FIG. 10, diagnosis data may not be disposed in the RAM 120, so that there is also an advantage that the storage area of the RAM 120 may be saved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing apparatus comprising:
   a processor; and
   a direct memory access (DMA) controller coupled to the processor, the DMA controller including a control circuit that controls a DMA transfer of data,
an error detection circuit that performs an error detection on the data based on a character assigned in association with the data to output a result of the error detection to the control circuit, and
a diagnosis circuit that disconnects the control circuit from the error detection circuit to diagnose an operation of the error detection circuit and provide a diagnosis result to the processor.

2. The data processing apparatus according to claim 1, wherein the processor executes a process when an abnormality is detected according to the diagnosis result provided by the diagnosis circuit.

3. The data processing apparatus according to claim 1, wherein
the diagnosis circuit inputs diagnosis data and the character to the error detection circuit, determines whether an error detection result for the diagnosis data by the error detection circuit is proper, and notifies the processor of the diagnosis result indicating an abnormality when the error detection result is not proper.

4. The data processing apparatus according to claim 1, wherein
the diagnosis circuit assigns time information indicating a time to the diagnosis result and notifies the processor of the diagnosis result, and wherein
the processor detects an abnormality of the error detection circuit based on the time information.

5. The data processing apparatus according to claim 4, wherein
when the processor detects that the error detection circuit is normal,
the diagnosis circuit alternately inputs, to the error detection circuit, first data in which no error exists and second data in which an error exists, and notifies the processor of the diagnosis result including an error detection result including sequential responses by the error detection circuit to an alternating inputs of the first data and the second data, and
the processor further detects an abnormality of the error detection circuit based on an order of with and without error responses included in the error detection result.

6. The data processing apparatus according to claim 1, wherein the diagnosis circuit reconnects the control circuit and the error detection circuit after the diagnosis circuit completes the diagnosis of the operation of the error detection circuit.

7. The data processing apparatus according to claim 1, wherein
the character is a block check character (BCC).

8. A diagnosis method of a direct memory access (DMA) controller including a control circuit, an error detection circuit, and a diagnosis circuit, the method comprising:
disconnecting the control circuit from the error detection circuit of the DMA controller to diagnose an operation of the error detection circuit;
providing, using the diagnosis circuit, data with a character to the error detection circuit to diagnose the operation of the error detection circuit; and
determining, with the diagnosis circuit, a diagnosis result based on a result of error detection received in response to the error detection circuit processing the data with the character.

9. The diagnosis method according to claim 8, further comprising:
notifying a processor connected to the DMA controller of the diagnosis result indicating an abnormality when the error detection result is not proper.

10. The diagnosis method according to claim 9, wherein when the error detection circuit is operating normally,
the diagnosis circuit alternately inputs, to the error detection circuit, first data in which no error exists and second data in which an error exists, and notifies the processor of the diagnosis result including an error detection result including sequential responses by the error detection circuit to an alternating inputs of the first data and the second data, and
the processor detects the abnormality of the error detection circuit based on an order of with and without error responses included in the error detection result.

11. The diagnosis method according to claim 8, further comprising:
assigning time information indicating a time to the diagnosis result;
notifying a processor connected to the DMA controller of the diagnosis result; and
detecting, with the processor, an abnormality of the error detection circuit based on the time information.

12. The diagnosis method according to claim 8, further comprising:
reconnecting the control circuit and the error detection circuit after the diagnosis circuit completes the diagnosis of the operation of the error detection circuit.

13. The diagnosis method according to claim 8, wherein the character is a block check character (BCC).

14. A data processing apparatus comprising:
a processor; and
a direct memory access (DMA) controller to control a DMA transfer of data, the DMA controller configured to perform a self-diagnosing procedure to detect a malfunction of an error detection circuit of the DMA controller when the DMA controller is in an idle state, wherein
a diagnosis result of the self-diagnosis procedure is not provided to the processor during the self-diagnosis procedure.

15. The data processing apparatus according to claim 14, wherein
the DMA controller includes a control circuit, a diagnosis circuit, and the error detection circuit, and
the self-diagnosis procedure includes the diagnosis circuit disconnecting the control circuit from the error detection circuit, providing the data with a character for error detection to the error detection circuit, receiving a result of error detection from the error detection circuit in response to the error detection circuit processing the data with the character, and determining the diagnosis result of the error detection circuit based on the result of error detection received from the error detection circuit.

* * * * *